Figure 1:
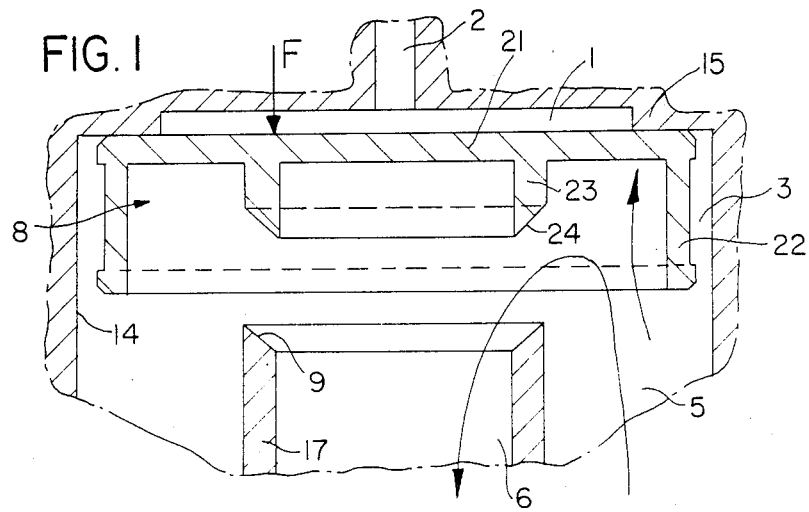

United States Patent [19]

Simoens

[11] Patent Number: 4,579,138

[45] Date of Patent: Apr. 1, 1986

[54] PISTON AND VALVE ARRANGEMENT

[76] Inventor: Hervé Simoens, 49 rue Emile Zola, 59000 Lille, France

[21] Appl. No.: 620,738

[22] Filed: Jun. 14, 1984

[30] Foreign Application Priority Data

Jun. 15, 1983 [FR] France ............... 83 10111

[51] Int. Cl.⁴ ........................................... F16K 11/044
[52] U.S. Cl. ................................................... 137/102
[58] Field of Search ................................. 137/102, 107

[56] References Cited

U.S. PATENT DOCUMENTS

| | | | |
|---|---|---|---|
| 212,972 | 3/1879 | Osgood | 137/102 |
| 2,041,148 | 5/1936 | Redfield | 137/102 |
| 2,567,391 | 9/1951 | Mead | 137/102 X |
| 3,070,112 | 12/1962 | Fricke | 137/102 |
| 3,788,527 | 1/1974 | Matson | |
| 3,827,451 | 8/1974 | Roob | 137/102 |
| 3,895,648 | 7/1975 | Stoll | 137/102 X |
| 4,051,982 | 10/1977 | Stetson | 137/102 X |
| 4,197,966 | 4/1980 | Wadensten | |

FOREIGN PATENT DOCUMENTS

| | | |
|---|---|---|
| 0021999 | 1/1981 | European Pat. Off. . |
| 1165955 | 3/1964 | Fed. Rep. of Germany ...... 137/102 |
| 2074786 | 10/1971 | France . |
| 2214651 | 8/1974 | France . |

Primary Examiner—Robert G. Nilson
Attorney, Agent, or Firm—Kerkam, Stowell, Kondracki & Clarke

[57] ABSTRACT

The invention relates to a piston for a quick dump valve disposed for filling a space after the evacuating or dumping of that space. The piston is in the form of a plate (21) having a short peripheral flange (22), the external face of which assures only relative guidance by engaging the cylinder with a play sufficiently great as to reserve a passage (3) for the gas supplied via the feed opening sufficient to allow this gas to reach the space and a medial flange (23), the edge of which has a bearing surface the shape of which is complementary to that of the seat (9) with which it cooperates in order to close the discharge passage. The valve is particularly adapted for improving the outflow of products at the outlet of silos.

3 Claims, 2 Drawing Figures

U.S. Patent  Apr. 1, 1986  4,579,138

PISTON AND VALVE ARRANGEMENT

The invention relates to a quick-dump valve and also to a valve piston for effecting pressurization of a space after the quick evacuation or dumping of that space.

The invention is applicable particularly, but not exclusively, to improving the outflow of a granular or pulverized product at the outlet of equipment such as silos or hoppers. The invention assures this improvement in outflow by eliminating stagnant packets in dead zones and/or by destroying either the material layer normally adhering to the wall or the bridge or arch formed by the product before the orifice of the outlet.

A quick-dump valve of this kind, sometimes called an air cannon, includes, on the one hand, a feed chamber provided with a refill opening and an opening communicating with the space to be pressurized and, on the other hand, a discharge passage to the equipment in which the sudden-discharge valve is applied. The feed chamber is embodied at the rear of a cylinder in which a freely translating piston is disposed. The piston undergoes a thrust in one direction due to the effect of a pressure, particularly that of the gas introduced into the feed chamber in order to refill the space.

In order to monitor the circulation of the gas in the discharge passage, this passage is divided into two sections by a seat with which a closure means cooperates. The closure means supports or directly embodies the piston. Seating of the piston is assured by the pressure acting upon the piston. As soon as the corresponding pressure is relieved in the feed chamber, the pressure of the gas located in the space acts upon the piston in the opposite direction from that of the thrust mentioned above and causes a rapid return stroke of the piston, which violently opens the discharge sleeve of the space, until the feed pressure reappears in order to refill or pressurize the space once again.

For the sake of slackening this feed pressure, the refill opening is generally connected to a source of gas under pressure via a multi-directional control valve, in particular making it possible arbitrarily either to close this opening or connect it to the pressure source or to the ambient air.

Aside from the fact that valve structures of this type are complicated and hence quite expensive, the first valves of this type to appear on the market are believed to be disclosed in U.S. Pat. No. 3,942,684 and have various disadvantages. A major disadvantage is the loss of pressure or head undergone by the gas when, because of the seat of the closure means, the gas has to traverse a passage of relatively narrow cross section in order to effect the discharge. The gas then takes more time to flow out, and this in turn considerably reduces the suddenness of the discharge.

Another disadvantage of this type of valve is due to the weight and hence the inertia of the piston and also to the bulk of the piston and its chamber. This is due to the fact that the piston had to be long enough, its length being in particular greater than its diameter, to assure that is guided as accurately as necessary in the cylinder in order to avoid any seizing, despite the fact that its fit in the interior of the cylinder is practically without play in order to establish the tightness between the feed chamber and the front of the piston necessary to guarantee the return of the closure means to its seat.

More recently, a new quick-dump valve intended to overcome the first of these disadvantages and hence to prevent a loss of head has appeared and is disclosed in French Pat. No. 2.429.952. The new valve of this French patent maintains a discharge passage of practically constant cross section, even through the seat. In this valve, the cylinder has a length equal to at least twice the diameter of the discharge passage, one of the sections of which is connected with the front of the cylinder, while the other section is pricked radially and toward the front of the cylinder in such a manner that its opening communicating with the cylinder is closed by the piston when the piston is at the front, but is opened widely when the piston is at the rear. The opening communicating with the cylinder then directly embodies the seat of the closure means, which is formed by the lateral surface of the piston.

For the sake of its guidance, as mentioned above, but also to embody the closure means of this seat, the piston must always have a length greater than the diameter of the discharge opening, resulting in both a piston and a cylinder that are long and therefore heavy, and hence causing the piston to have a certain inertia and a control requiring a large passage. This results in increased costs for materials for, and increased bulk of, both the piston and the cylinder.

Because of this weight, at least one of the ends of the piston is equipped with a stop of relatively flexible material in order to limit the damage caused by the impacts of the piston at the end of its stroke; unfortunately, however, this material, deteriorates rapidly. Further, this material generally prevents its usage in systems operating at high temperatures. High temperatures heat the valve by conduction to the point that the stop deteriorates. This is the case, for example, in cement works.

One object of the invention is to provide a quick-dump discharge valve piston which, while avoiding the loss of head and any seizing of the piston, is slight in length and hence has reduced weight, inertia and bulk. These and other advantages of the subject invention are obtained in a piston of the above type characterized in that it is in the form of a plate provided, first, with a short peripheral flange, the external face of which assures only relative guidance by engaging the cylinder with a play sufficiently great as to reserve a passage for the gas supplied via the feed opening sufficient to allow this gas to reach the space and, second, with a medial flange the edge of which has a bearing surface the shape of which is complementary to that of the seat with which it cooperates in order to close the discharge passage.

Another object of the invention is to provide a quick-dump valve provided with such a piston.

Figure 2:
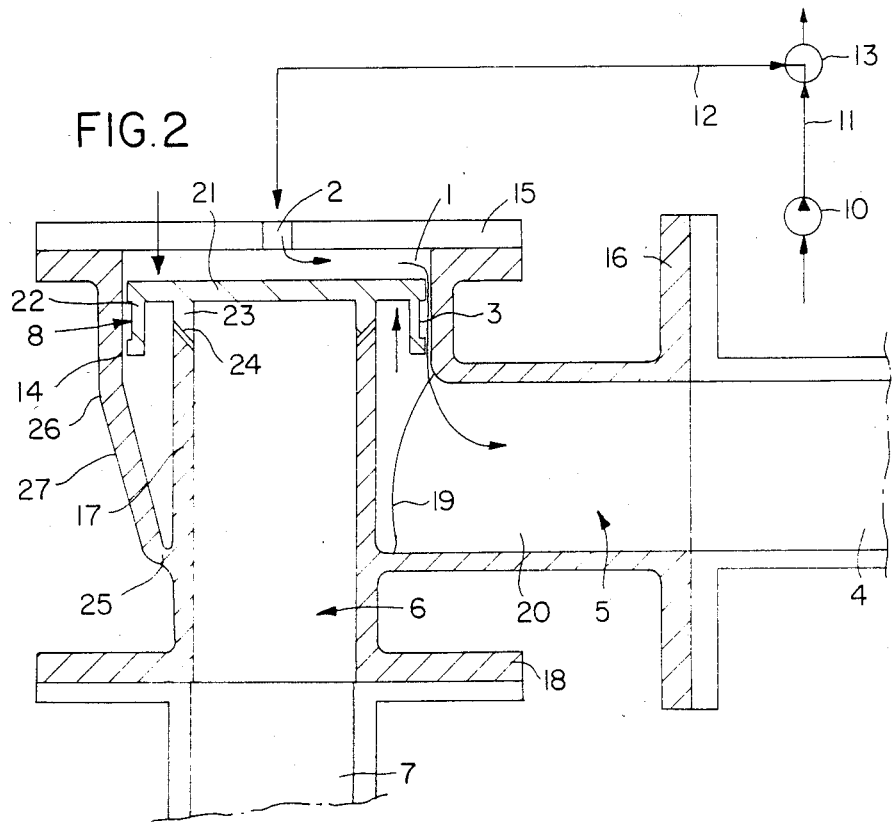

The invention will be more clearly understood with the aid of the ensuing description of a non-limiting example, taken in conjunction with the following drawings wherein:

FIG. 1, illustrates the piston shown in section with a partial illustration, in light lines, of the feed chamber and the seat provided on the discharge passage; and FIG. 2, illustrates a valve provided with a piston according to the invention.

Referring to the drawings, the valve includes: a feed chamber 1 provided with a refill opening 2 and passages 3 and 5 leading to a space 4. The discharge passage is shown in two sections 5, 6 connected to the equipment 7 to which the valve is connected.

A free piston 8 is disposed in the feed chamber 1 and undergoes a thrust in the direction of the arrow F due to the effect of the pressure of the gas introduced into the chamber 1 in order to refill or pressurize the space 4. In order to monitor the circulation of the gas in the discharge passage comprising sections 5, 6, this passage takes its course by way of a seat 9 cooperating with a closure means embodied directly by the piston 8. The first section 5 of the discharge passage extends from the space 4 to the seat 9, while the second section 6 of this discharge passage extends from the seat 9 to the equipment 7 and forms the discharge sleeve per se. The seating of the closure means is assured automatically as a result of the above-mentioned pressure pushing the piston 8.

As soon as the feed pressure in the chamber 1 has slackened i.e., is reduced, the gas pressure prevailing in the space 4 like-wise acts upon the piston 8, but in the opposite direction from the arrow F, causing the piston to return with a rapid stroke. This piston 8 thus violently opens the seat 9 of the discharge sleeve 6.

With a view to slackening or reducing the feed pressure in chamber 1, the refill opening 2 is connected to a source 10 of gas under pressure, via a conduit in two sections 11, 12 interconnected via a three-way valve 13 allowing the closure of this opening 2 or its connection with either the pressure source 10 or the ambient air.

The feed chamber 1 is formed by a housing defined by the piston 8 at the end of a cylinder 14, which at this end is for this purpose provided with a bottom or closure cap 15 traversed by the refill opening 2. This cylinder also includes, first, a connecting flange 16 connecting one (5) of the sections 5, 6 of the discharge passage with the space 4 and, second, a tubular element 17 limiting the displacement of the piston 8 toward the front, while the inlet of element 17 embodies the seat 9 of the closure means 8. This tubular element 17 protects the other section 6 of the discharge passage and for this reason has at its outer end a flange 18 connecting it with the equipment 7.

This tubular element 17 penetrates the cylinder 14 on the one hand such as to reserve between it and the cylinder an annular conduit the cross section of which is equal to the inside cross section of the tubular element and thus to the cross section of the section 6 of the discharge passage which it protects and, on the other hand, at a depth such that after the return stroke of the piston a passage remains between the closure means 8 and the seat 9 at the periphery of the seat, this passage being in the form of a lateral surface of the cylinder, the length of which is equal to that of the distance across the tubular element 17 and thus to the distance across the cross section of the section 6 of the discharge passage which it protects.

The other section 5 of the discharge passage is shown to be connected to space 4 via an opening 19 of the same cross section toward the front of the cylinder, for example by means of a conduit 20 perpendicular to the axis of the cylinder 14 and having a flange 16 connected to an associated flange of a conduit leading to or defining space 4.

According to one characteristic of the invention, this conduit 20 is connected between the short 25 and long 26 bases of a truncated cone 27 forming the lower end of the cylinder and by way of which the cylinder is connected on the periphery of the tubular element 17. This conicity is such as to assure the constancy of the cross section of the passage between the conduit 20 and the annular passage reserved between the tubular element 17 and the cylinder 14.

According to one characteristic of the invention, the piston 8 is in the form of a plate 21, provided with a short peripheral flange 22, the external face of which assures only relative guidance by engaging the cylinder with a play sufficiently great so as to reserve a passage 3 formed by the clearance between the outside diameter of plate 21 and diameter of cylinder 14 in the area of stroke of piston 8. As shown in FIG. 2, this area of the cylinder has a constant diameter due to the straight side wall of the cylinder at the top end of the cylinder 14 as shown in the drawing. The lower end of cylinder 14 takes the truncated cone form between the short 25 and long base 26 as previously described. Thus, passage 3 between the circumferential edge of plate 21 and cylinder assures that the gas supplied via the feed opening reaches the space 4 via conduit 20 and discharge passage 5. Piston 8 also includes a medial flange 23, the edge of which has a bearing surface the shape of which is complementary to that of the seat 9 with which it cooperates in order to close the discharge passage. The peripheral flange 22 is sufficiently fine and short that in the discharge position it does not block the cross section of the passage. Plate 21 has a diameter slightly less than that of the cylinder.

In a preferred embodiment, in order to assure self-centering, the seat 9 and the bearing surface 24 of the medial flange are conical and the seat and bearing surface may be metal. Thus embodied, the piston makes it possible to assure a metal-to-metal seal allowing the use of the valve in equipment that operates at high temperature and/or in a corrosive atmosphere.

All of the portion of the piston located at the periphery of the tubular element plainly has a surface that is amply sufficient to assure the instantaneous return of the piston to the bottom of the cylinder as soon as the feed pressure disappears. The baffle effect produced by the peripheral flange in turn prevents any escape of the discharging flow upward toward the feed chamber, the inlet or refill opening 2 of which is furthermore relatively closed by the application of the piston against the bottom 15 of the cylinder.

Because of these simple short flanges, the piston is very light in weight and is not bulky, and only slight displacements are required in order to control it. Space 4 may represent the output or discharge opening of a silo the contents of which are discharged through equipment or discharge pipe 7 through the valve embodying piston 8 and the pressure applied to the surface of its plate 21 via feed or refill opening 2.

I claim:
1. A feed valve comprising:
a piston (8) for allowing the pressurization of a space space (4) after the quick evacuation of the space through a conduit (7), said piston having a front face and a rear face and including a plate (21) having a peripheral flange (22) and a medial flange (23) with a conical bearing surface (24), said peripheral flange and said medial flange both extending from said front face; a cylinder (14) having at one end thereof a feed chamber (1) defined on a side by said rear face, said piston disposed within said cylinder, said cylinder having interior walls and having a cop (15) closing off the cylinder at said one end;
a refill opening (2) in said cap;
a passage (3) about said piston allowing communication between said feed chamber and said space (4), said passage about said piston disposed between said peripheral flange and said cylinder; a conduit (7);

a conical seat (9) adapted to receive said conical bearing surface;

a discharge passage having two passage sections (5, 6) connected respectively between said space (4) and said conduit (7); said conduit comprising a tubular element (17) penetrating into the cylinder so as to limit the displacement of the piston (8) toward the front and in order that the inlet embodies the seat (9) of the closure means, said tubular element (17) being disposed to penetrate into the cylinder (14), so as to reserve between it and the cylinder an annular conduit, the cross section of which is equal to the inside cross section of the tubular element and hence to the cross section of the section (6) of the passage which it protects, said element penetrating to a depth such that after the return stroke of the piston, a passage remains at the periphery of the seat, between the piston (8) and the seat (9); and wherein said feed valve is operable upon introduction of pressurized gas into said feed chamber (1) by way of said refill opening (2) to force said piston (8) into a closed position with said bearing surface (24) contacting said seat (9) to close said discharge passage and with gas passing along said passage (3) about said piston (8) to pressurize said space (4) such that, upon a dropping of gas pressure in said feed chamber (1), gas pressure in said space (4) acts on part of said front face of said piston (8) to rapidly force a return stroke of said piston (8) into an open position against said cap (15) and connect said passage sections (5, 6) to allow the evacuation of granular or pulverized material from said space (4) into said conduit (7).

2. A valve as defined in claim 1, wherein the section (5) of the discharge passage connected to the space (4) is connected to an other end of the cylinder opposite said one end and to an opening (19) of the same cross section as the inside cross section of the tubular element (17).

3. A valve as defined in claim 1, further including an annular space extending within short and long bases of a truncated cone forming said other end of said cylinder and between the cylinder and the tubular element (17) and said truncated cone being tapered such that it assures the constancy of the cross section of the section (5) of the discharge passage connected to the space (4) and the annular space, said opening (19) being disposed in said truncated cone.

* * * * *